United States Patent
Foster et al.

(10) Patent No.: US 8,417,967 B2
(45) Date of Patent: Apr. 9, 2013

(54) STORAGE DEVICE DATA ENCRYPTION USING A BINARY LARGE OBJECT (BLOB)

(75) Inventors: Joseph E. Foster, Houston, TX (US); Robert C. Elliott, Houston, TX (US); Jeffrey A. Plank, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/935,715

(22) PCT Filed: Apr. 2, 2008

(86) PCT No.: PCT/US2008/059072
§ 371 (c)(1),
(2), (4) Date: Sep. 30, 2010

(87) PCT Pub. No.: WO2009/123630
PCT Pub. Date: Oct. 8, 2009

(65) Prior Publication Data
US 2011/0029785 A1    Feb. 3, 2011

(51) Int. Cl.
| G06F 11/30 | (2006.01) |
| G06F 12/14 | (2006.01) |
| H04K 1/00  | (2006.01) |
| H04L 9/00  | (2006.01) |
| H04L 9/30  | (2006.01) |

(52) U.S. Cl.
USPC ........... 713/189; 713/193; 713/194; 380/277; 380/29; 380/30

(58) Field of Classification Search .................... 713/189
See application file for complete search history.

(56) References Cited

U.S. PATENT DOCUMENTS

| 5,638,445 | A  * | 6/1997  | Spelman et al.  | 705/77  |
| 5,761,311 | A  * | 6/1998  | Spelman et al.  | 380/30  |
| 5,764,768 | A  * | 6/1998  | Spelman et al.  | 725/117 |
| 7,305,561 | B2 * | 12/2007 | Hunt et al.     | 713/182 |
| 7,502,754 | B2 * | 3/2009  | Campbell et al. | 705/35  |
| 7,640,593 | B2 * | 12/2009 | Tarkkala        | 726/26  |
| 7,891,008 | B2 * | 2/2011  | Fortune et al.  | 726/27  |
| 7,940,934 | B2 * | 5/2011  | Buer            | 380/277 |
| 8,068,613 | B2 * | 11/2011 | Scaralata       | 380/283 |
| 8,127,146 | B2 * | 2/2012  | Thom et al.     | 713/189 |
| 8,204,228 | B2 * | 6/2012  | Weis et al.     | 380/277 |
| 8,213,618 | B2 * | 7/2012  | Dewan           | 380/277 |
| 8,259,948 | B2 * | 9/2012  | Smith et al.    | 380/277 |
| 2003/0028664 | A1 |  2/2003 | Tan et al.      |         |
| 2003/0174842 | A1 * | 9/2003 | Challener       | 380/277 |

(Continued)

FOREIGN PATENT DOCUMENTS

JP    2007157049    6/2007

OTHER PUBLICATIONS

International Preliminary Report on Patentability issued Oct. 5, 2010, in International Application No. PCT/US2008/059072.

(Continued)

*Primary Examiner* — Carolyn B Kosowski

(57) ABSTRACT

Embodiments include methods, apparatus, and systems for storage device data encryption. One method includes encrypting data on a storage device with a key and then transmitting the key to a cryptographic module that encrypts the key to form a Binary Large Object (BLOB). The BLOB is transmitted to an array controller that is coupled to the storage device which stores the BLOB.

20 Claims, 6 Drawing Sheets

U.S. PATENT DOCUMENTS

| | | |
|---|---|---|
| 2004/0117625 A1 | 6/2004 | Grawrock |
| 2005/0138360 A1 | 6/2005 | Kamalakantha |
| 2006/0242428 A1* | 10/2006 | Tarkkala ........................ 713/189 |
| 2008/0022412 A1 | 1/2008 | Challener |
| 2009/0038017 A1* | 2/2009 | Durham et al. ................. 726/27 |
| 2009/0169012 A1* | 7/2009 | Smith et al. .................... 380/277 |
| 2009/0210723 A1* | 8/2009 | Yoshida ......................... 713/189 |
| 2009/0307499 A1* | 12/2009 | Senda ........................... 713/187 |
| 2010/0142711 A1* | 6/2010 | Weis et al. ..................... 380/277 |
| 2010/0169667 A1* | 7/2010 | Dewan ........................... 713/193 |
| 2011/0029785 A1* | 2/2011 | Foster et al. ................... 713/189 |
| 2011/0197066 A1* | 8/2011 | Senda ........................... 713/171 |
| 2011/0246785 A1* | 10/2011 | Linsley et al. ................. 713/189 |

OTHER PUBLICATIONS

International Search Report mailed Mar. 25, 2009, in International Application No. PCT/US2008/059072.

Microsoft Corp., "BitLocker Drive Encryption: Scenarios, User Experience, and Flow," May 16, 2006, available at: <http://msdn.microsoft.com/en-us/library/windows/hardware/gg463165.aspx>.

Microsoft Corp., "BitLocker Drive Encryption: Technical Overview," May 16, 2006.

\* cited by examiner

STORAGE DEVICE DATA ENCRYPTION USING A BINARY LARGE OBJECT (BLOB)

BACKGROUND

Disk drives receive read and write requests from host computers in many storage systems. For security, data stored on the disk drives needs to be encrypted. In order to secure the data, important issues arise as to how to secure the data being stored and where to store the cryptographic keys.

In some storage systems, the host computer sends both the cryptographic key and the data to the drive. In this operation, the host controls both the cryptographic keys and data flow.

In other storage systems, the cryptographic keys are stored on a central key server. Timely and secure management of a large number of cryptographic keys in a single server is a difficult task. For instance, problems can arise since many different users or hosts need to be authenticated at the server in order to access the cryptographic keys. Further, if the cryptographic key is stored within the server, then the server that supports the corresponding disk array controller must be aware of the specific requirements associated with storing each cryptographic key.

In still other storage systems, the cryptographic key is stored in the disk array controller. If the array controller fails, however, then the stored cryptographic key becomes trapped within the failed controller and the associated data stored on the disks is not accessible.

DETAILED DESCRIPTION

Figure 1A:
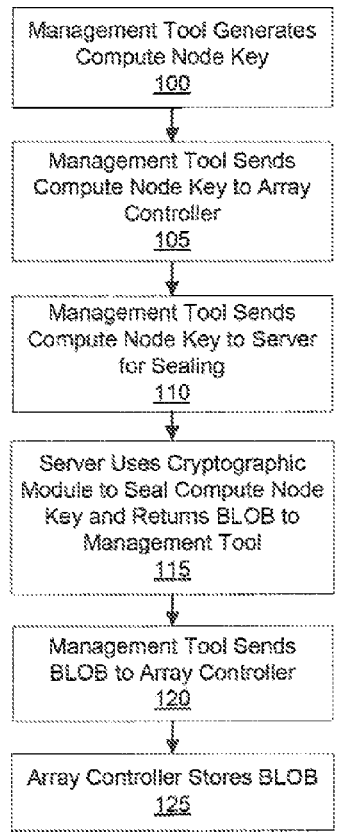
FIG. 1A is a flow diagram for storing a cryptographic key in a disk drive in accordance with an exemplary embodiment of the present invention.

Embodiments in accordance with the present invention are directed to apparatus, systems, and methods for automating cryptographic key management in storage systems. One exemplary embodiment securely acquires, delivers, and stores cryptographic keys used to encrypt and decrypt data in storage devices, such as disk drives. Further, exemplary embodiments protect removable media (such as hard disk drives) from unauthorized access when the removable media is moved or placed in an unauthorized appliance.

In one exemplary embodiment, a cryptographic key is provided from a disk controller to a key server. The cryptographic key is used to encrypt and decrypt data on the disk drive. Upon receiving the cryptographic key, the key server adds data to the cryptographic key and encrypts it to form a Binary Large Object (BLOB). The BLOB, now being sealed or encrypted, is then sent back to the controller which directs the BLOB to a disk drive for storage.

In order to unseal the BLOB, the disk controller transmits the sealed BLOB to the key server. Upon receiving the BLOB, the key server unseals the BLOB and returns the original cryptographic key back to the controller and disk drive. Data can now be read from and written to the disk drive using the cryptographic key.

Since the disk drive actually stores the BLOB, the disk drive can migrate from one controller to another while still providing access to the stored data. After a migration, the disk drive provides the BLOB back to the key server, and the key server returns to the original cryptographic key to the disk drive.

In one embodiment, the key server includes a cryptographic module (such as a Trusted Platform Module, TPM) to generate the BLOB. The key server does not permanently store the BLOB, but sends it to the disk drive for storage. As such, the key server is not burdened with storing state information (such as keys and BLOBS) for numerous disk drives. Instead, storage of the BLOBS occurs on the respective disk drives, while the key server is used to convert to seal and unseal the BLOBS once received.

Each key server has a unique identity or identification. In one embodiment, this unique identity is used to seal and unseal the cryptographic keys received from the array controllers. Since an identity is unique to a specific key server, only the key server that sealed the BLOB can later unseal the BLOB and extract the original key. As an example, each key server can store various unique keys (for example, each customer or host having one or more unique keys) that are used to seal and unseal data for specific storage devices.

One embodiment stores a compute node key BLOB or key server key BLOB in the metadata area of the disk drive. For example, the BLOB for binding or sealing a RAID (Redundant Array of Independent/Inexpensive Disks) controller compute node key using the server TPM is stored in the non-user accessible metadata area of the disk drive. The metadata area of the disk drive is a section of the disk drive that is separate from application data and not accessible by users.

Figure 1B:
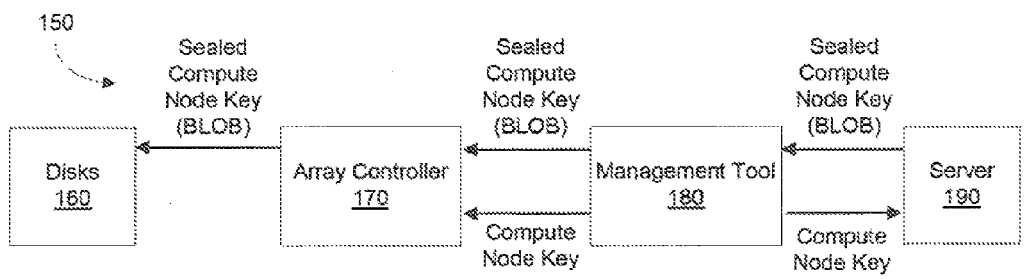
FIG. 1B is a block diagram of a system for storing a cryptographic key in a disk drive in accordance with an exemplary embodiment of the present invention.

FIG. 1A shows a flow diagram for storing/sealing a cryptographic key in a storage device, and FIG. 1B shows a block diagram of a system 150 for storing/sealing the cryptographic key in the storage device in accordance with an exemplary embodiment of the present invention. For illustration, the storage device is shown as a disk drive, and the cryptographic key is shown as a compute node key.

In one embodiment, a volume access policy defines a set of rules or policies that for accessing the disk drives. If the volume access policy is set to include compute node, the encrypted disk data can only be properly decrypted if the RAID controller is in the appropriate server. If the volume access policy is set to include compute node configuration, the encrypted disk data can only be properly decrypted if the RAID controller is in the appropriate server with the server appropriately configured. The server and server configuration is verified with the use of the Trusted Platform Module BLOB sealing mechanism. There can be one or more compute node keys per RAID controller (for example, multiple compute node keys exist in a blade environment). The design implementation allows for a different compute node key per storage volume.

In one embodiment, the compute node key does not leave the cryptographic boundary in plain text and is not stored in non-volatile memory. Instead, the key is encrypted before leaving the cryptographic boundary. The compute node key is regenerated by the server Trusted Platform Module on every power up initialization process.

According to block 100, a management tool 180 generates the compute node key. For example, the management tool (implemented in hardware and/or software) generates a 256 bit compute node key using a random number generator.

According to block 105, the management tool 180 sends the compute node key to the array controller 170. Once received, the array controller 170 adds the compute node key to the volume access policy.

According to block 110, the management tool 180 then sends the compute node key to the server 190 for sealing. By way of example, the management tool 180 transports the compute node key to a cryptographic module (such as a Trusted Platform Module) in the server 190 and requests that compute node key is sealed to create a BLOB.

According to block 115, the server 190 uses the cryptographic module to seal or encrypt the compute node key to create a BLOB. The sealed compute node key (now an encrypted BLOB) is returned to the management tool 180. By way of example, a TPM seals the compute node key and returns the resulting BLOB to the management tool.

According to block 120, the management tool 180 sends the BLOB to the array controller 170. In one embodiment, this exchange does not need to be encrypted because the BLOB itself does not reveal any cryptographic secrets.

According to block 125, the array controller 170 provides the BLOB to the disk drive 160 where the BLOB is stored. For example, array controller 170 stores the sealed compute node key in the metadata area volume specific information area for the appropriate volume(s).

Figure 2A:
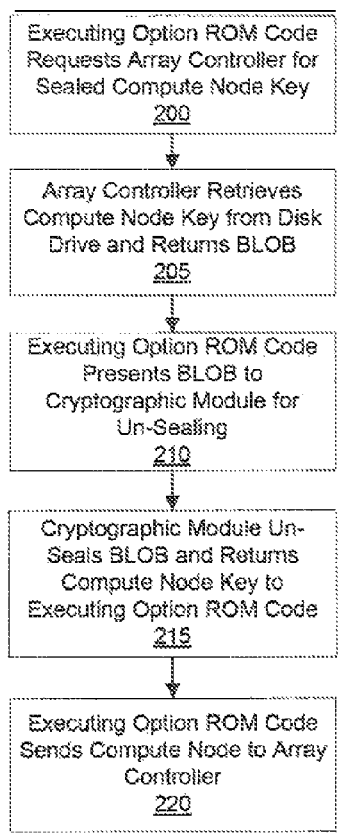
FIG. 2A is a flow diagram for retrieving a cryptographic key from a disk drive in accordance with an exemplary embodiment of the present invention.
Figure 2B:
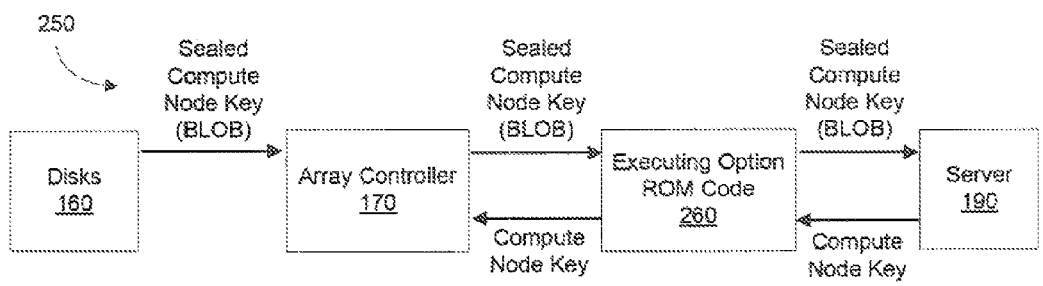
FIG. 2B is a block diagram of a system for retrieving a cryptographic key from a disk drive in accordance with an exemplary embodiment of the present invention.

FIG. 2A shows a flow diagram for retrieving/unsealing a cryptographic key in a storage device, and FIG. 2B shows a block diagram of a system 250 for retrieving/unsealing the cryptographic key in the storage device in accordance with an exemplary embodiment of the present invention. FIG. 2B shares like reference numerals with FIG. 1B.

According to block 200, software code 260 executing on a host requests the array controller 170 for the sealed compute node key (i.e., BLOB). For illustration, the code is shown as executing option ROM code.

According to block 205, the array controller 170 retrieves the BLOB from the disk drive 160 and returns it to the host. For example, the RAID controller retrieves the appropriate sealed compute node key from the disk drive and returns it from the RAID controller NVRAM.

According to block 210, the executing option ROM code 260 presents the BLOB to a cryptographic module in the server 190 for unsealing. For example, the executing option ROM code transmits the BLOB to the Server Trusted Platform Module requesting that the compute node key be unsealed.

According to block 215, the cryptographic module unseals the BLOB and returns the original compute node key back to the executing option ROM code. If the RAID controller 170 is in the appropriate server (with the server appropriately configured) the server Trusted Platform Module will return to the executing option ROM code the original compute node key.

According to block 220, the executing option ROM code 260 sends the compute node key to the array controller 170. Data can now be encrypted or decrypted to and from the disk drive.

Exemplary embodiments can also be used with a key server and corresponding key server key. For example, if the volume access policy is set to include a key server key (such as a 256 bit key), the encrypted disk data can only be decrypted if the array controller can communicate with the key server (i.e. on the appropriate network). In one embodiment, there is one key server key per volume, and the key server key is generated by the key server. Depending on the key server policy all volumes can use the same key server key, or each volume key server key can be unique.

The key server key is associated to a specific volume based on the volumes LUN (Logical Unit Number) Identifier. In one embodiment, the volume LUN Identifier is persistent even after volume migration to a foreign controller ensuring that the encrypted volumes continue to be accessible even after a drive migration (assuming controller access policy did not include a compute node key of a different server).

The key server key is stored in volatile memory, except on the key server where the key is stored in non-volatile memory. When the key server key crosses the cryptographic boundary, it is first encrypted with another key, such as a transport key. By way of example, the transport key is created with an unauthenticated Diffie-Hellman exchange (IKEv2-SCSI) between the array controller and the management tool.

The transport key is created in response to the need to send a key across the cryptographic boundary. Once a transport key has been established it is store in volatile memory on the array controller. The transport key can be used multiple times for multiple keys or passwords crossing the cryptographic boundary. The generation of a new transport key (to replace an existing transport key) can be requested at any time by the management tool.

In one embodiment, the array controller does not communicate directly with the key server. Instead, the array controller communicates with the management tool which in turn communicates with the key server. During the communication exchange, the array controller does not authenticate itself (on purpose). If volume access is to be restricted to a specific array controller, then the controller access policy is set to include the local key.

If the array controller makes a request to the key server (with the help of the management tool) for a key server key and the key server declines (for any reason) after some reasonable time out and number of retries, the volume associated with that key is disabled.

If the volume access policy is set to include the key server key then the encrypted disk data can only be decrypted if the array controller can communicate with the key server (i.e. on the appropriate network). In one embodiment, there is one key server key per volume, and the key server key is generated by the key server. Depending on the key server policy all volumes can use the same key server key or each volume key server key can be unique.

In one embodiment, the key server key does not leave the cryptographic boundary in plain text and is not stored in non-volatile memory (it is encrypted before leaving the cryptographic boundary). The key server key is regenerated by the key server on every power up initialization process.

According to block 300, a management tool 380 generates the key server key. For example, the management tool (implemented in hardware and/or software) generates a 256 bit key server key using a random number generator.

According to block 305, the management tool 380 sends the key server key to the array controller 370. Once received, the array controller 370 adds the key server key to the volume access policy.

According to block 310, the management tool 380 then sends the key server key to the server 390 for sealing. By way of example, the management tool 380 transports the key server key to a cryptographic module (such as a Trusted Platform Module) in the server 390 and requests that key server key is sealed to create a BLOB.

According to block 315, the server 390 uses the cryptographic module to seal or encrypt the key server key to create a BLOB. The sealed key server key (now an encrypted BLOB) is returned to the management tool 380. By way of example, a TPM seals the key server key and returns the resulting BLOB to the management tool.

According to block 320, the management tool 380 sends the BLOB to the array controller 370. In one embodiment, this exchange does not need to be encrypted because the BLOB itself does not reveal any cryptographic secrets.

According to block 325, the array controller 370 provides the BLOB to the disk drive 360 where the BLOB is stored. For example, array controller 370 stores the sealed key server key in the metadata area of the volume specific information area for the appropriate volume(s).

Figure 3A:
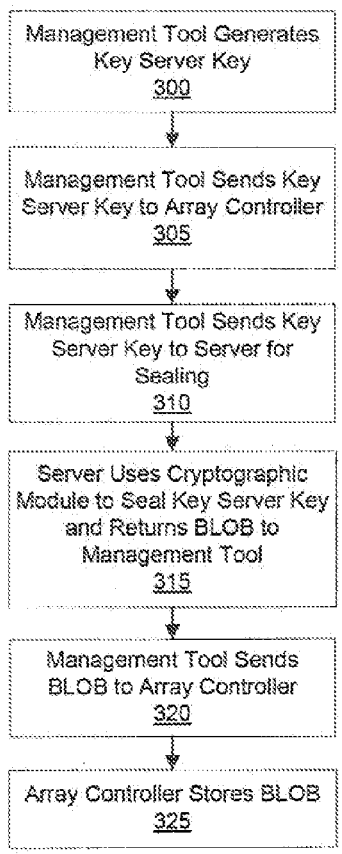
FIG. 3A is another example of a flow diagram for storing a cryptographic key in a disk drive in accordance with an exemplary embodiment of the present invention.
Figure 3B:
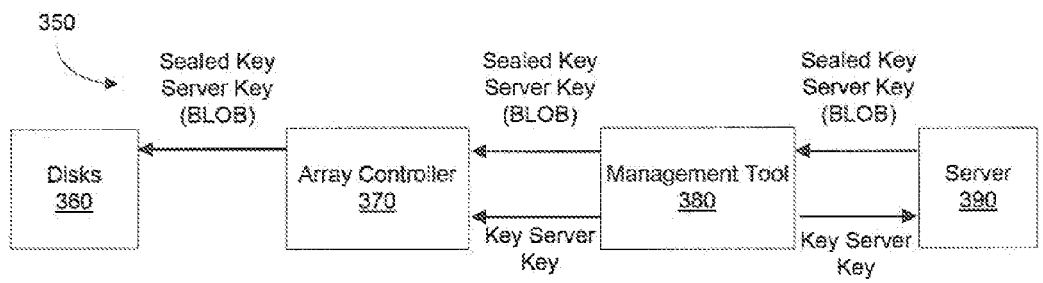
FIG. 3B is a block diagram of a system for storing a cryptographic key in a disk drive in accordance with an exemplary embodiment of the present invention.
Figure 4A:
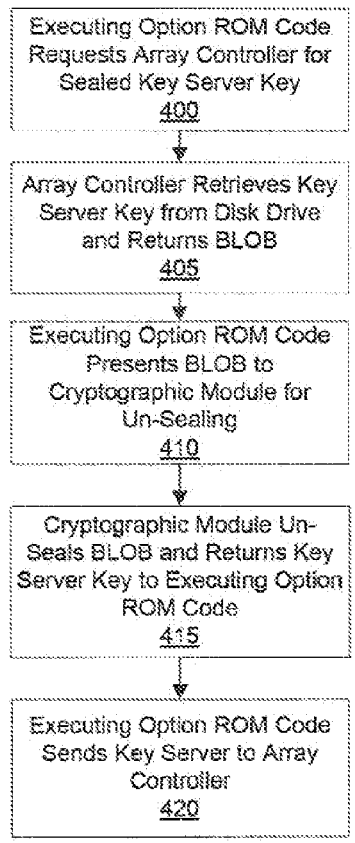
FIG. 4A is another example of a flow diagram for retrieving a cryptographic key from a disk drive in accordance with an exemplary embodiment of the present invention.
Figure 4B:
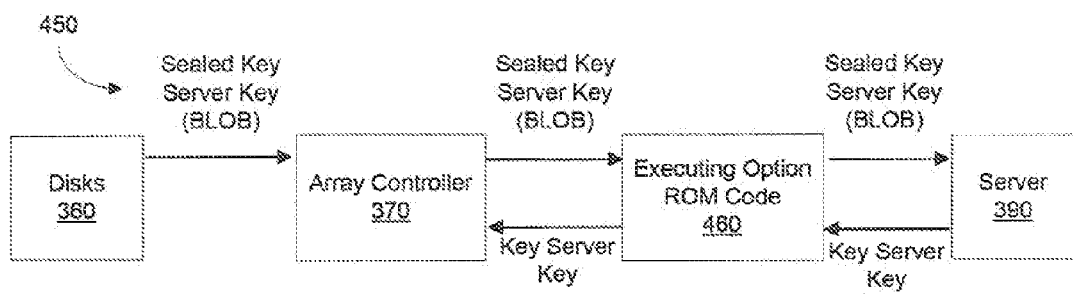
FIG. 4B is a block diagram of a system for retrieving a cryptographic key from a disk drive in accordance with an exemplary embodiment of the present invention.

FIG. 4A shows a flow diagram for retrieving/unsealing a cryptographic key in a storage device, and FIG. 4B shows a block diagram of a system 450 for retrieving/unsealing the cryptographic key in the storage device in accordance with an exemplary embodiment of the present invention. FIG. 4B shares like reference numerals with FIG. 3B.

According to block 400, software code 460 executing on a host requests the array controller 370 for the sealed key server key (i.e., BLOB). For illustration, the code is shown as executing option ROM code.

According to block 405, the array controller 370 retrieves the BLOB from the disk drive 360 and returns it to the host. For example, the RAID controller retrieves the appropriate sealed key server key from the disk drive and returns it from the RAID controller NVRAM.

According to block 410, the executing option ROM code 460 presents the BLOB to a cryptographic module in the server 390 for unsealing. For example, the executing option ROM code transmits the BLOB the Server Trusted Platform Module requesting that key server key be unsealed.

According to block 415, the cryptographic module unseals the BLOB and returns the original key server key back to the executing option ROM code. If the RAID controller 370 is in the appropriate server (with the server appropriately configured) the server Trusted Platform Module will return to the executing option ROM code the original key server key.

According to block 420, the executing option ROM code 460 sends the key server key to the array controller 370. Data can now be encrypted or decrypted to and from the disk drive.

Embodiments in accordance with the present invention are utilized in a variety of systems, methods, and apparatus. For illustration, exemplary embodiments are discussed in connection with a hard disk drive storage system. Exemplary embodiments, however, are applicable to other types of storage systems, such as storage devices using tape cartridges, optical disks, or movable media.

Figure 5:
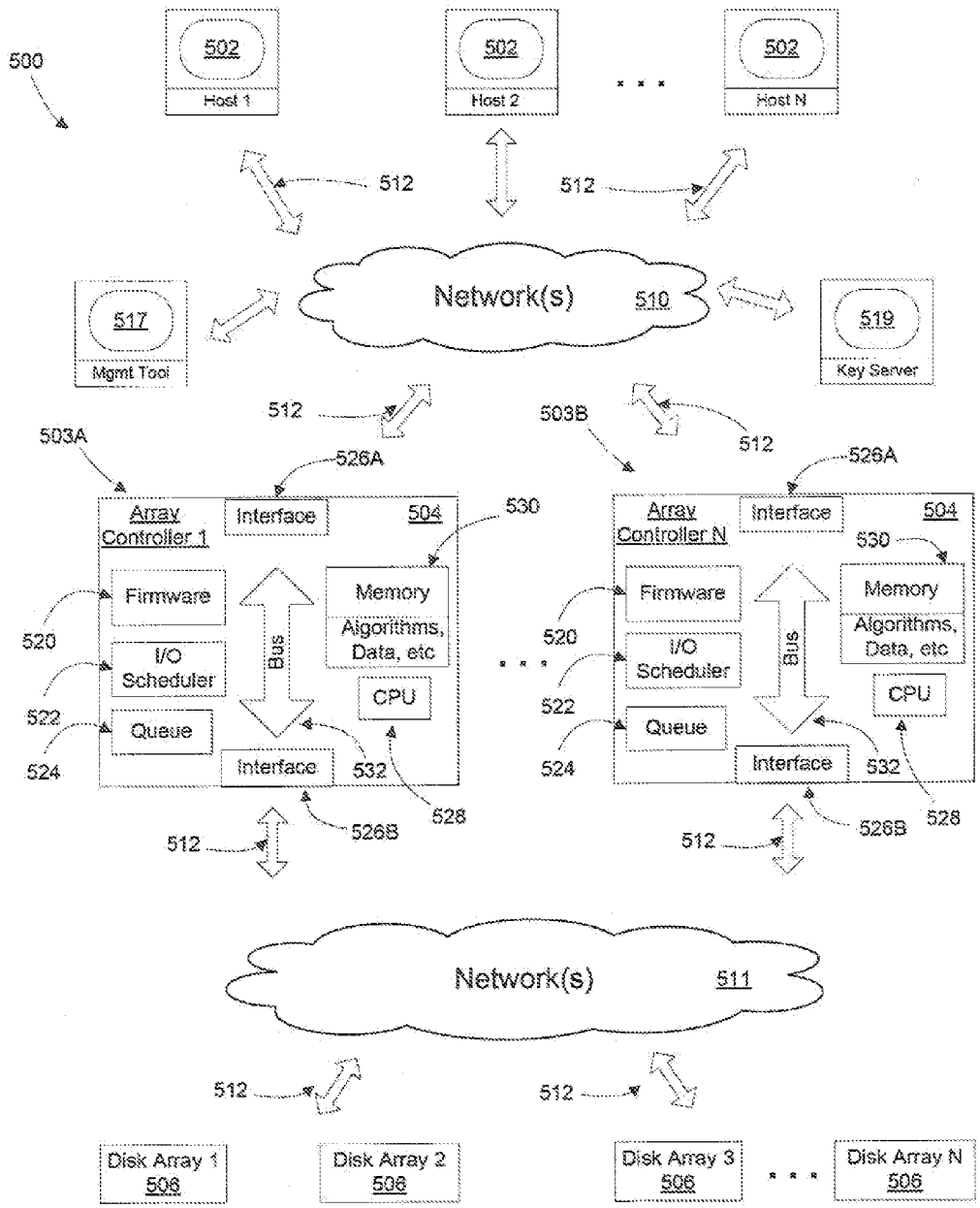
FIG. 5 is a storage system for using encryption in accordance with an exemplary embodiment of the present invention.

FIG. 5 is a block diagram of an exemplary distributed file or storage system 500 in accordance with an exemplary embodiment of the invention. By way of example, the system is a storage network and/or a storage area network (SAN) that includes a plurality of host computers 502 and one or more storage devices or arrays 503A, 503B that include one or more storage controllers 504 (shown by way of example as an array controller), and a plurality of storage devices 506 (shown by way of example as disk array 1 to disk array N).

The host computers 502 (shown as host 1 to host N) are coupled to the array controllers 504 through one or more fabrics or networks 510, and the storage devices or arrays 503 are coupled to the storage devices 506 through one or more fabrics or networks 511. A management tool 517 couples to the networks 510 for communication with the array controllers 504 and one or more servers 519, such as a key server. For instance, the hosts communicate with an array controller using a small computer system interface (SCSI) or other interface/commands over a Fibre Channel (FC). By way of example, networks 510 and 511 include one or more of the Ethernet, Fibre Channel (FC), Serial Attached SCSI (SAS), iSCSI, internet, local area network (LAN), wide area network (WAN), public and/or private networks, etc. Communications links 512 are shown in the figure to represent communication paths or couplings between the hosts, controllers, storage devices, management tool, and servers.

In one exemplary embodiment, the array controller 504 and disk arrays 506 are network attached devices providing random access memory (RAM) and/or disk space (for storage and as virtual RAM) and/or some other form of storage such as magnetic memory (example, tapes), micromechanical systems (MEMS), or optical disks, to name a few examples. Typically, the array controller and disk arrays include larger amounts of RAM and/or disk space and one or more specialized devices, such as network disk drives or disk drive arrays, (example, redundant array of independent disks (RAID)), high speed tape, magnetic random access memory (MRAM) systems or other devices, and combinations thereof. In one exemplary embodiment, the array controller 504 and disk arrays 506 are memory nodes that include one or more servers.

The storage controller 504 manages various data storage and retrieval operations. Storage controller 504 receives I/O requests or commands from the host computers 502, such as data read requests, data write requests, maintenance requests, etc. Storage controller 504 handles the storage and retrieval of data on the multiple disk arrays 506 and disk groups. In one exemplary embodiment, storage controller 504 is a separate device or may be part of a computer system, such as a server. Additionally, the storage controller 504 may be located with, proximate, or a great geographical distance from the disk arrays 506 or from each other.

The array controller 504 includes numerous electronic devices, circuit boards, electronic components, etc. By way of example, the array controller 504 includes firmware 520, an input/output (I/O) scheduler 522, a buffer or queue 524 (for example, used to temporarily store the metadata structures during ownership transfer), one or more interfaces 526, one or more processors 528 (shown by way of example as a CPU, central processing unit), and memory 530 (including read and write cache). CPU 528 performs operations and tasks necessary to manage the various data storage and data retrieval requests received from host computers 502. For instance, processor 528 is coupled to a host interface 526A that provides bidirectional data communications to one or more host computers 502. Processor 528 is also coupled to an array interface 526B that provides bidirectional data communications to the disk arrays 506.

Memory 530 is also coupled to processor 528 and stores various information used by processor when carrying out its tasks. By way of example, memory 530 includes one or more of volatile memory, non-volatile memory, or a combination of volatile and non-volatile memory. The memory 530, for example, stores applications, data, control programs, algorithms (including software to implement or assist in implementing embodiments in accordance with the present invention), and other data associated with the storage device (example, state data such as mapping metadata, configuration metadata, and cached user data). The processor 528 communicates with memory 530, interfaces 526, and the other components via one or more buses 532.

In at least one embodiment, the storage devices are fault tolerant by using existing replication, disk logging, and disk imaging systems and other methods including, but not limited to, one or more levels of redundant array of inexpensive disks (RAID). Replication provides high availability when one or more of the disk arrays crash or otherwise fail. Further, in one exemplary embodiment, the storage devices provide memory in the form of a disk or array of disks where data items to be addressed are accessed as individual blocks stored in disks (example, 512, 1024, 4096, etc. . . . bytes each) or stripe fragments (4K, 16K, 32K, etc. . . . each).

In one embodiment the storage devices 503A, 503B are disk arrays. Each disk array can have one or more controllers. For instance, an array has two controllers for redundancy. Further, the storage devices include both production disks and backup disks as discussed herein.

In one embodiment, storage devices 503A, 503B are physically located in a same data center. In another embodiment, the storage devices are located a great geographical distance apart in separate data centers. Further, although only two storage devices are shown, a SAN can include hundreds or thousands of such storage devices.

Figure 6:
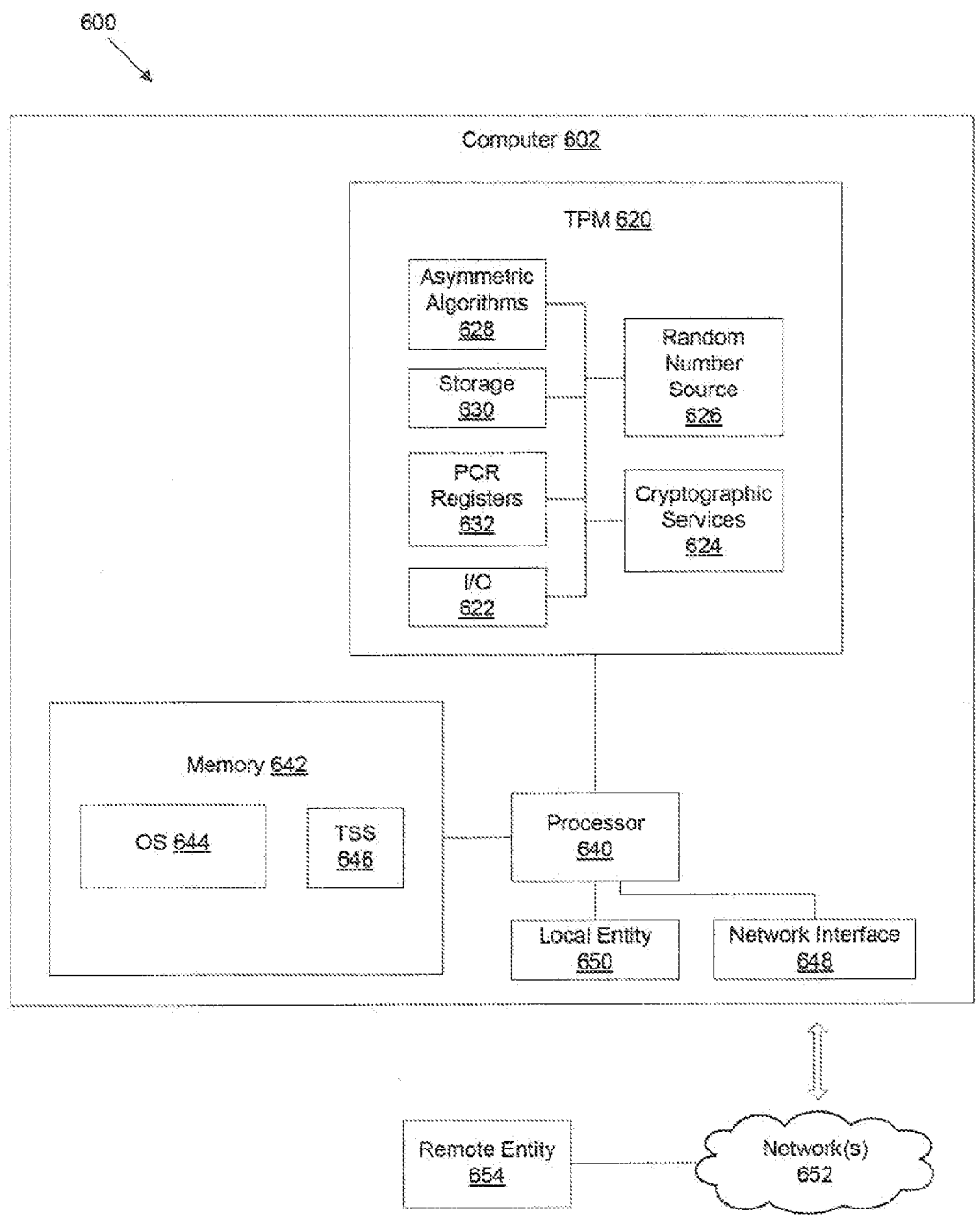
FIG. 6 is a computer or storage system for using encryption in accordance with an exemplary embodiment of the present invention.

FIG. 6 shows an exemplary embodiment of a computer or storage system 600. The system includes a computer 602 (such as key server) for using a cryptographic module 620. The computer 602 couples to at least one remote entity 654 via a network 652. The computer 602 may be, for example, a server, a desktop computer, a laptop computer or a mobile device. The computer 602 comprises a processor 640 coupled to at least one local entity 650. As used herein "local entities" refer to hardware/firmware/software entities that are internal to the computer 602 and "remote entities" refer to hardware/firmware/software entities that are external to the computer 602. Examples of local entities include but are not limited to an Operating System and peripherals such as a smartcard reader, a hard disk drive, network controller, and a graphics controller. Examples of remote entities include but are not limited to various portable and non-portable computers and/or electronic devices such as hosts, disk arrays, controllers, servers, main frame computers, distributed computing devices, laptops, and other electronic devices and systems whether such devices and systems are portable or non-portable.

The processor 640 also couples to a network interface 648 and memory 642 which stores an operating system (OS) 644 for the computer 602. As shown, the memory 642 may also store a Trusted Platform Module Software Stack 646 (TSS) which handles requests sent to a Trusted Platform Module (TPM) 620 coupled to the processor 640.

The TPM 620 is configured to provide cryptographic functions such as an RSA asymmetric algorithm for digital signature and for encryption, SHA-1 hashing, a Hash-based Message Authentication Code (HMAC) function, secure storage, random number generation, or other functions. The TPM 620 is implemented using software, firmware and/or hardware. The TPM components shown in FIG. 6 have been generalized and are not all-inclusive. Also, TPM architectures and functions may possibly change over time as authorized by the Trusted Computing Group (TCG).

As shown in FIG. 6, the TPM 620 comprises an input/output (I/O) interface 622 in communication with the processor 640. The I/O interface 622 couples to other TPM components such as cryptographic services 624, a random number source 626, asymmetric algorithms 628, storage 630 and Platform Configuration Registers (PCRs) 632. The cryptographic services 624 support functions such as hashing, digital signing, encryption and decryption. The random number source 626 generates random numbers for the cryptographic services 624. For example, in some embodiments, the cryptographic services 624 use random numbers to generate cryptographic keys. The asymmetric algorithms 628 enable the TPM 620 to perform asymmetric key operations. The storage 630 securely stores secrets (for example, cryptographic keys or other data) protected by the TPM 620. The PCRs 632 store information about the current state of the computer 602. For example, in some embodiments, the PCRs 632 store individual integrity measurements related to the computer 602 as well as sequences of integrity measurements.

Exemplary embodiments provide for a method to store the TPM generated BLOB independent of the server that housed the TPM (requiring no server specific support). As such, embodiments ensure access to the disk data even if the RAID controller that encrypted the data fails and is replaced by another encrypting RAID controller (i.e. the BLOB is not trapped or stored in the failed RAID controller, but stored in the drive). Furthermore, exemplary embodiments do not require human intervention to perform a computer node key back up operation since the BLOB is stored by the RAID Controller on each drive of a multi-drive RAID set. In the event of a TPM migration from one server to another, the associated disk drives may also be migrated to the new server without the involvement of a cryptographic officer.

Exemplary embodiments protect the array controllers (both hardware and software based) from other RAID controllers. Where the RAID controller BLOB is stored is apparent because the feature set a specific controller will offer (i.e. the difficulty to migrate drives) and the fact that cryptographic applications usually disclose their key management architecture. Furthermore, since the BLOB is stored in the metadata portion of the drive, proof of authentication is the BLOB itself, rather than a certificate or private key.

Definitions:

As used herein and in the claims, the following words have the following definitions:

As used herein, a "BLOB" is encrypted data that is generated by a cryptographic module or processor, such as a TPM (for use in Protected Storage, or for saving context outside the TPM).

As used herein, the term "storage device" means any data storage device capable of storing data including, but not limited to, one or more of a disk array, a disk drive, a tape drive, a solid state drive, an optical drive, a SCSI device, or a Fibre Channel device. As used herein, a "disk array" or "array" is a storage system that includes plural disk drive, a cache, and controller. Arrays include, but are not limited to, networked attached storage (NAS) arrays, modular SAN arrays, monolithic SAN arrays, utility SAN arrays, and storage virtualization.

As used herein, "TPM" or "Trusted Platform Module" is a cryptographic processor implemented in accordance with the specifications defined in the TCG Trusted Platform Module Specification. TPM provides various functions, such as secure generation of cryptographic keys, remote attestation, sealed storage, binding, and a hardware random number generator.

In one exemplary embodiment, one or more blocks in the flow diagrams are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive, flash memory, or hard drive. The software programming code is embodied or stored on any of a variety of known media for use with a data processing system or in any memory device such as semiconductor, magnetic and optical devices, including a disk, hard drive, CD-ROM, ROM, flash memory, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   encrypting, with an array controller, data on a storage device with a cryptographic key;
   transmitting the cryptographic key to a cryptographic module, wherein the cryptographic module is to encrypt the key to form a Binary Large Object (BLOB);
   receiving the BLOB with the array controller, which is coupled to the storage device; and
   storing the BLOB on the storage device.

2. The method of claim 1 further comprising:
   receiving a request to decrypt the data on the storage device;
   in response to the request, transmitting the BLOB retrieved from the storage device to the cryptographic module, the cryptographic module to extract the cryptographic key from the BLOB;
   receiving, from the cryptographic module with the array controller, the cryptographic key extracted from the BLOB; and
   decrypting the data on the storage device with the received cryptographic key.

3. The method of claim 1, wherein the storing the BLOB on the storage device comprises:
   storing the BLOB in an accessible metadata portion of the storage device.

4. The method of claim 1, wherein the cryptographic module is a Trusted Platform Module (TPM).

5. The method of claim 1, wherein the key is a key server key.

6. The method of claim 1, wherein the storage device is a disk drive.

7. The method of claim 1, further comprising:
   coupling another storage device to the array controller;
   transmitting another BLOB retrieved from the another storage device to the cryptographic module, the cryptographic module to extract another cryptographic key from the another BLOB; and
   using the another cryptographic key to read data from the another storage device.

8. A non-transitory computer readable medium having instructions for causing a processor of a controller to:
   store a Binary Large Object (BLOB) on a storage device;
   transmit the BLOB, retrieved from the storage device, to a cryptographic module, the cryptographic module to extract a cryptographic key from the BLOB;
   receive the cryptographic key at the controller, wherein the controller is coupled to the storage device; and
   use the cryptographic key to encrypt or decrypt, with the controller, data stored on the storage device.

9. The non-transitory computer readable medium of claim 8, wherein the instructions for causing the processor to transmit the BLOB comprise instructions for causing the processor to:
   provide the BLOB to a host, the host to transmit the BLOB to the cryptographic module with a request to unseal the BLOB.

10. The non-transitory computer readable medium of claim 8, further comprising instructions for causing the processor to:
    send the cryptographic key to a server including the cryptographic module, after the key is used to encrypt or decrypt the data stored on the storage device, the cryptographic module to form the BLOB based on the cryptographic key; and
    transmit the BLOB formed by the cryptographic module to the storage device for storage.

11. The non-transitory computer readable medium of claim 8, wherein the instructions for causing the processor to store the BLOB comprise instructions for causing the processor to:
    store the BLOB in a secure section of the storage device that is separate from application data and not accessible by users.

12. The non-transitory computer readable medium of claim 8, wherein the cryptographic key is a compute node key and the controller is a storage controller.

13. The non-transitory computer readable medium of claim 8, wherein the instructions for causing the processor to store the BLOB comprise instructions for causing the processor to:
store the BLOB on each storage device in a multi-drive Redundant Array of Independent/Inexpensive Disks (RAID) set, wherein the controller is a RAID controller.

14. The non-transitory computer readable medium of claim 8 further comprising instructions for causing the processor to:
set and enforce authentication policy for the storage device without requiring a server including the cryptographic module to store the BLOB.

15. The non-transitory computer readable medium of claim 8 further comprising instructions for causing the processor to:
send the cryptographic key to a server including the cryptographic module, the cryptographic module to use an identity unique to the server to seal the key and form the BLOB.

16. A storage system, comprising:
an array controller in communication with a cryptographic module, the cryptographic module to seal a key to form a Binary Large Object (BLOB), wherein the array controller is to:
store the BLOB on a storage device connected to the array controller;
transmit the BLOB to the cryptographic module, the cryptographic module to extract the key from the BLOB;
receive the key from the cryptographic module; and
encrypt or decrypt data stored on the storage device with the received key.

17. The storage system of claim 16, wherein the cryptographic module is a Trusted Platform Module (TPM) located in a server.

18. The storage system of claim 16, wherein the array controller is a Redundant Array of Independent/Inexpensive Disks (RAID) controller and is to store the BLOB in an accessible metadata portion of the storage device.

19. The storage system of claim 16, wherein the array controller is to transmit the BLOB to the cryptographic module via a host in communication with the cryptographic module.

20. The storage system of claim 16, wherein the key is a compute node key.

* * * * *